(12) United States Patent
Sacco et al.

(10) Patent No.: US 12,337,647 B2
(45) Date of Patent: Jun. 24, 2025

(54) ELECTRIC DRIVE VEHICLE PROVIDED WITH A THERMOREGULATION SYSTEM

(71) Applicant: FERRARI S.P.A., Modena (IT)

(72) Inventors: Paolo Sacco, Modena (IT); Matteo Tassinari, Modena (IT); Enrico D'Angelo, Modena (IT)

(73) Assignee: FERRARI S.P.A., Modena (IT)

( * ) Notice: Subject to any disclaimer, the term of this patent is extended or adjusted under 35 U.S.C. 154(b) by 226 days.

(21) Appl. No.: 18/354,314

(22) Filed: Jul. 18, 2023

(65) Prior Publication Data
US 2024/0025224 A1 Jan. 25, 2024

(51) Int. Cl.
*G05D 23/00* (2006.01)
*B60H 1/00* (2006.01)

(52) U.S. Cl.
CPC ..... *B60H 1/00278* (2013.01); *B60H 1/00392* (2013.01); *B60H 1/00885* (2013.01); *B60H 2001/00307* (2013.01)

(58) Field of Classification Search
CPC ............ B60H 1/00278; B60H 1/00392; B60H 1/00885; B60H 2001/00307
USPC ......................................................... 165/287
See application file for complete search history.

(56) References Cited

U.S. PATENT DOCUMENTS

| | | | |
|---|---|---|---|
| 2014/0060796 A1* | 3/2014 | Ichishi ................. | B60H 1/0075 165/41 |
| 2014/0102666 A1* | 4/2014 | Ichishi ............... | B60H 1/00828 165/287 |
| 2022/0161629 A1 | 5/2022 | Wada | |

FOREIGN PATENT DOCUMENTS

| | | | | |
|---|---|---|---|---|
| CN | 216659503 U | 6/2022 | | |
| DE | 102020123900 A1 | 3/2021 | | |
| JP | WO2013065549 A1 * | 5/2013 | ................ | F01P 7/14 |
| WO | 2021122949 A1 | 6/2021 | | |

OTHER PUBLICATIONS

Italian Search Report for Application No. 102022000015240, Filing Date: Jul. 20, 2022; Date of Mailing—Mar. 6, 2023, 7 pages.

* cited by examiner

*Primary Examiner* — Davis D Hwu
(74) *Attorney, Agent, or Firm* — CANTOR COLBURN LLP

(57) ABSTRACT

A vehicle having: at least one electric drive system; a battery; a passenger compartment; an air conditioning system to air-condition the passenger compartment and provided with at least one heat exchanger; a first thermoregulation circuit configured to have the fluid flow through the drive system; a second thermoregulation circuit configured to have the fluid flow through the battery; a third thermoregulation circuit configured to have the fluid flow through the heat exchanger; an electric heater, which is arranged along the third thermoregulation circuit and can be operated in order to heat the fluid flowing in the third thermoregulation circuit; and at least one solenoid valve movable between an isolation position, in which the fluid flowing through the first thermoregulation circuit does not flow through the third thermoregulation circuit, and a connection position, in which the fluid flowing through the first thermoregulation circuit also flows through the third thermoregulation circuit.

12 Claims, 4 Drawing Sheets

ELECTRIC DRIVE VEHICLE PROVIDED WITH A THERMOREGULATION SYSTEM

CROSS-REFERENCE TO RELATED APPLICATIONS

This patent application claims priority from Italian patent application Ser. No. 102022000015240 filed on Jul. 20, 2022, the entire disclosure of which is incorporated herein by reference.

TECHNICAL FIELD

The invention relates to an electric drive vehicle provided with a thermoregulation system.

PRIOR ART

A vehicle can be provided with one single electric motor or with several electric motors (in which case, the drive is a full electric drive) or it can be provided with one or more electric motors combined with a combustion engine (in which case, the drive can be a full electric drive, a combustion drive or a hybrid drive).

The electric motor (or each electric motor) is mechanically connected to the drive wheels and is electrically connected to a battery through the interposition of an electronic power converter.

In order to correctly operate and avoid a quick degradation, the battery has to remain at a relatively constant work temperature and, hence, has to be coupled to a thermoregulation system capable of cooling the battery when there is excess heat (even while charging, when the vehicle is parked) and also capable of heating the battery when it is too cold (typically after a cold start). As a matter of fact, the temperature range within which batteries operate in an ideal manner goes from 10° to 30° (lithium batteries, in some use condition, can reach up to 45°, which is anyway considered a limit operating temperature); beyond this range there is the risk for some components of deteriorating and, with an overheating beyond 70°, flammable elements, such as the acids and the solvents making up the electrolytes, are more likely to catch fire, whereas, below the aforesaid temperature range, the battery can be subjected to efficiency drops, which, below zero, translate into a loss of up to 40% of the estimated range.

Electric motors and the respective electronic power converters have to be cooled (when necessary) in order to prevent their temperature from exceeding a temperature limit beyond which a quick degradation (if the temperature threshold is exceeded by a small extent and for a short amount of time) or even permanent damages (if the temperature threshold is exceeded by a great extent and for a long amount of time) can occur. Furthermore, electric motors and the respective electronic power converters generally have an energy efficiency that is slightly greater when their inner temperature is lower (since the electrical resistance of conductor metals slightly decreases as the temperature decreases). Therefore, electric motors and the respective electronic power converters must be coupled to a thermoregulation system as well, which is capable of cooling when there is excess heat.

The passenger compartment of the vehicle requires a proper air conditioning for the comfort of the occupants thereof and, hence, the air conditioning system of the passenger compartment has to be coupled to a thermoregulation system, which is capable of cooling when it is hot and is also capable of heating when it is cold.

In a vehicle provided with an internal combustion engine there is a large availability of heat, which can be used to heat all those components that require heating, since the internal combustion engine, during its operation, produces a large quantity of heat at a high temperature (the work temperature of the cooling liquid of the internal combustion engine is of circa 70-90° C.)

On the other hand, in a full electric drive vehicle, there is a relative small availability of heat, since electric motors and the respective electronic power converters typically operate with an energy efficiency of more than 95% and, hence, develop a small quantity of heat (especially in case of city use). As a consequence, a full electric drive vehicle has to be provided with electric devices for the generation of heat (generally speaking, heating resistances or a heat pump), which can generate heat when it is necessary (basically for the battery and the passenger compartment); however, these electric devices for the generation of heat use part of the power stored in the battery and, hence, when they are used, inevitably reduce the range of the vehicle.

Patent application WO2021122949A1 discloses a cooling system of an electric vehicle, wherein a cooling valve is provided, which has a plurality of inputs and outputs, which can be connected to one another with different connection possibilities.

DESCRIPTION OF THE INVENTION

The object of the invention is to provide an electric drive vehicle provided with a thermoregulation system, which ensures a greater range thanks to a higher energy efficiency in the generation of the heat needed for the heating and, at the same time, is easy and economical to be manufactured.

According to the invention, there is provided an electric drive vehicle provided with a thermoregulation system according to the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
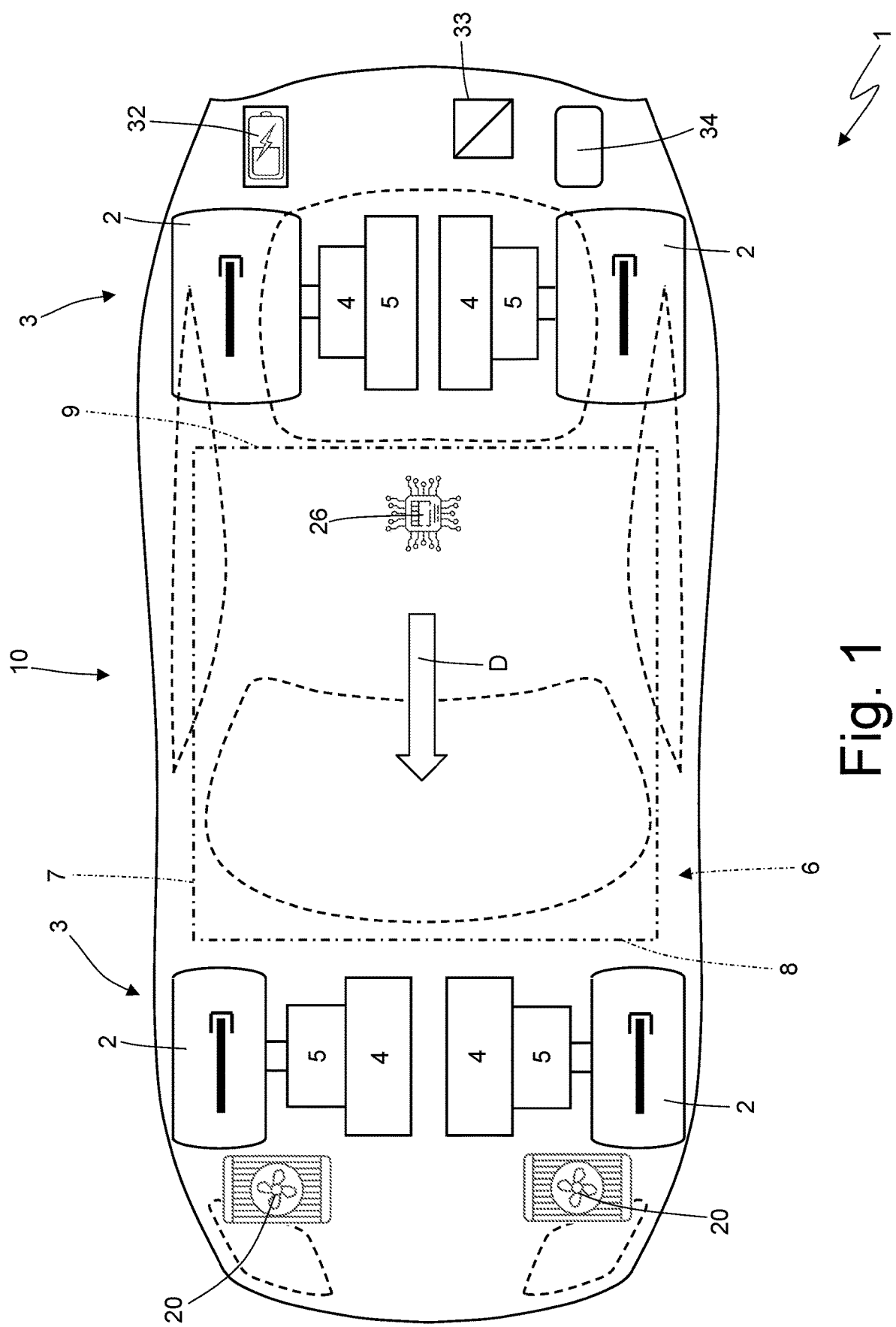
FIG. 1 is a schematic plan view of an electric drive road vehicle according to the invention.

In FIG. 1, number 1 indicates, as a whole, an electric drive vehicle provided with four drive wheels 2 (two front drive wheels 2 and two rear drive wheels 2).

The vehicle 1 comprises an electric drive system 3, which is arranged in a front position (namely, is connected to the two front drive wheels 2), and an electric drive system 3, which is arranged in a rear position (namely, is connected to the two rear drive wheels 2), is completely identical to the electric drive system 3 arranged in a front position from a structural point of view and is completely independent of and separate from the electric drive system 3 arranged in a front position from a mechanical point of view.

According to a different embodiment which is not shown herein, the vehicle 1 comprises one single electric drive system 3 (arranged in a front position or arranged in a rear position) and, therefore, it only has two drive wheels 2; in this embodiment, the vehicle 1 could also comprise a combustion drive system connected to the drive wheels 2 that do not receive the motion from said single electric drive system 3.

Each electric drive system 3 comprises a pair of reversible electric machines 4 (i.e. which can work both as eclectic motor, absorbing electrical energy and generating a mechanical torque, and as electric generator, absorbing mechanical energy and generating electrical energy) provided with respective shafts and a pair of drivetrains 5, which connect the electric machines 4 (namely, the shafts of the electric machines 4) to the corresponding drive wheels 2.

Each electric machine 4 is controlled by a corresponding AC/DC electronic power converter (namely, an "inverter"), which is connected to a battery 6; namely, each DC-AC electronic power converter is a two-way converter and comprises a DC side, which is connected to the battery 6, and a three-phase AC side, which is connected to the corresponding electric machine 4.

The battery 6 has a flat and relatively this shape, so that it can be integrated in the floorboard of the vehicle 1. In particular, the battery 6 comprises a container 7, which accommodates, on the inside, a plurality of modules provided with respective groups of electrochemical cells with a parallelepiped shape (namely, having a pouch structure or a prismatic structure). The container 7 has a lower wall (which constitutes the bottom of the vehicle 1 facing the road surface and obviously is horizontally oriented), an upper wall, which is parallel to and opposite the lower wall, a front wall 8 facing a front part of the vehicle 1 (namely, facing the front of the vehicle 1 relative to a travel direction D) and a rear wall 9 opposite the front wall 8 and facing a rear part of the vehicle 1 (namely, facing the back of the vehicle 1 relative to the travel direction D).

Figure 2:
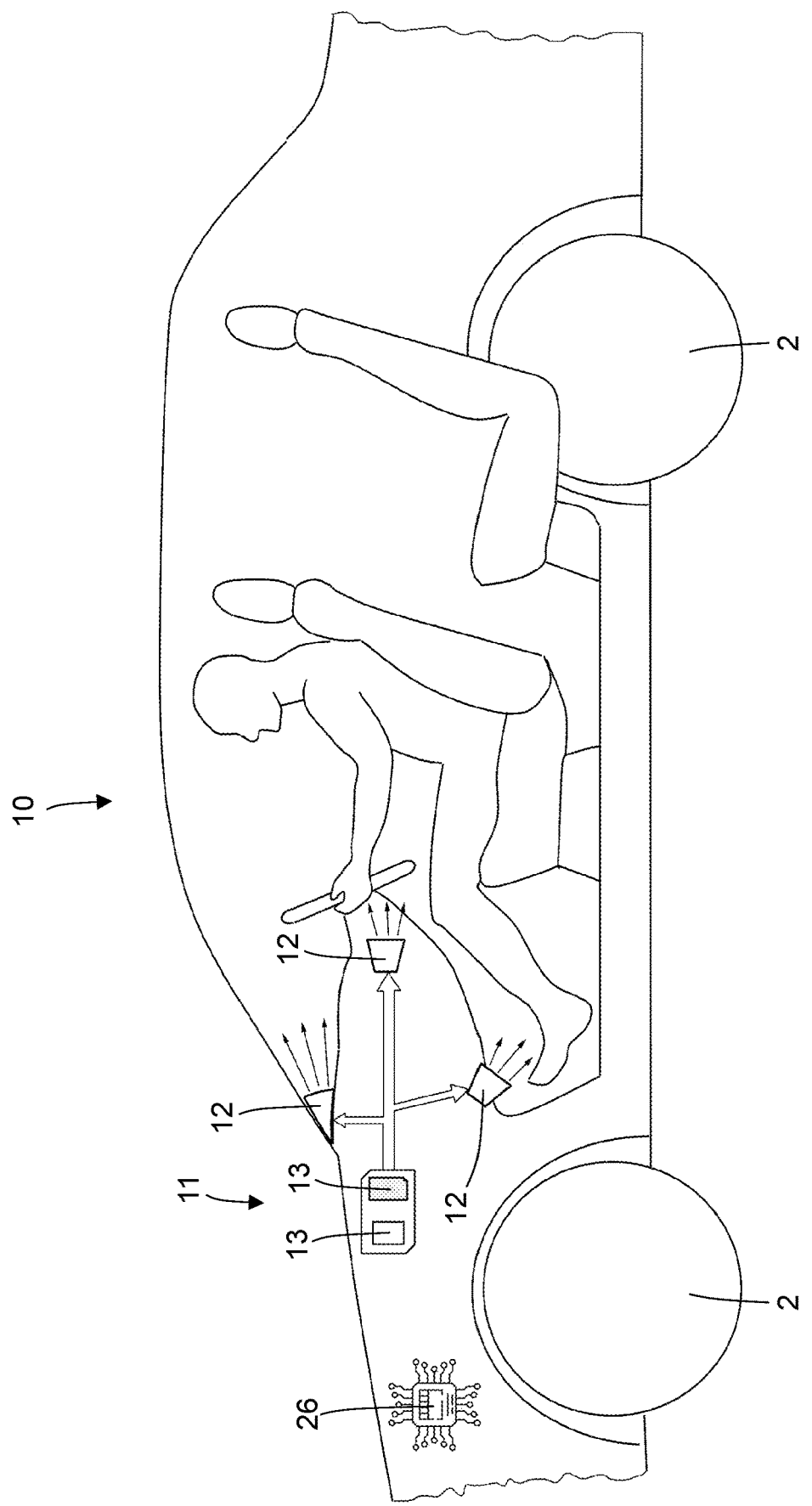
FIG. 2 is a schematic side view of the vehicle of FIG. 1.

According to FIG. 2, the vehicle 1 comprises a passenger compartment 10 and an air conditioning system 11 to air-condition the passenger compartment 10 by introducing conditioned air flows into the passenger compartment 10 through a plurality of air vents 12. The air conditioning system 11 comprises, among other things, two heat exchangers 13 connected to one another in parallel and configured to heat air using a hot fluid (in particular, a mixture of water and glycol, as explained more in detail below).

Figure 3:
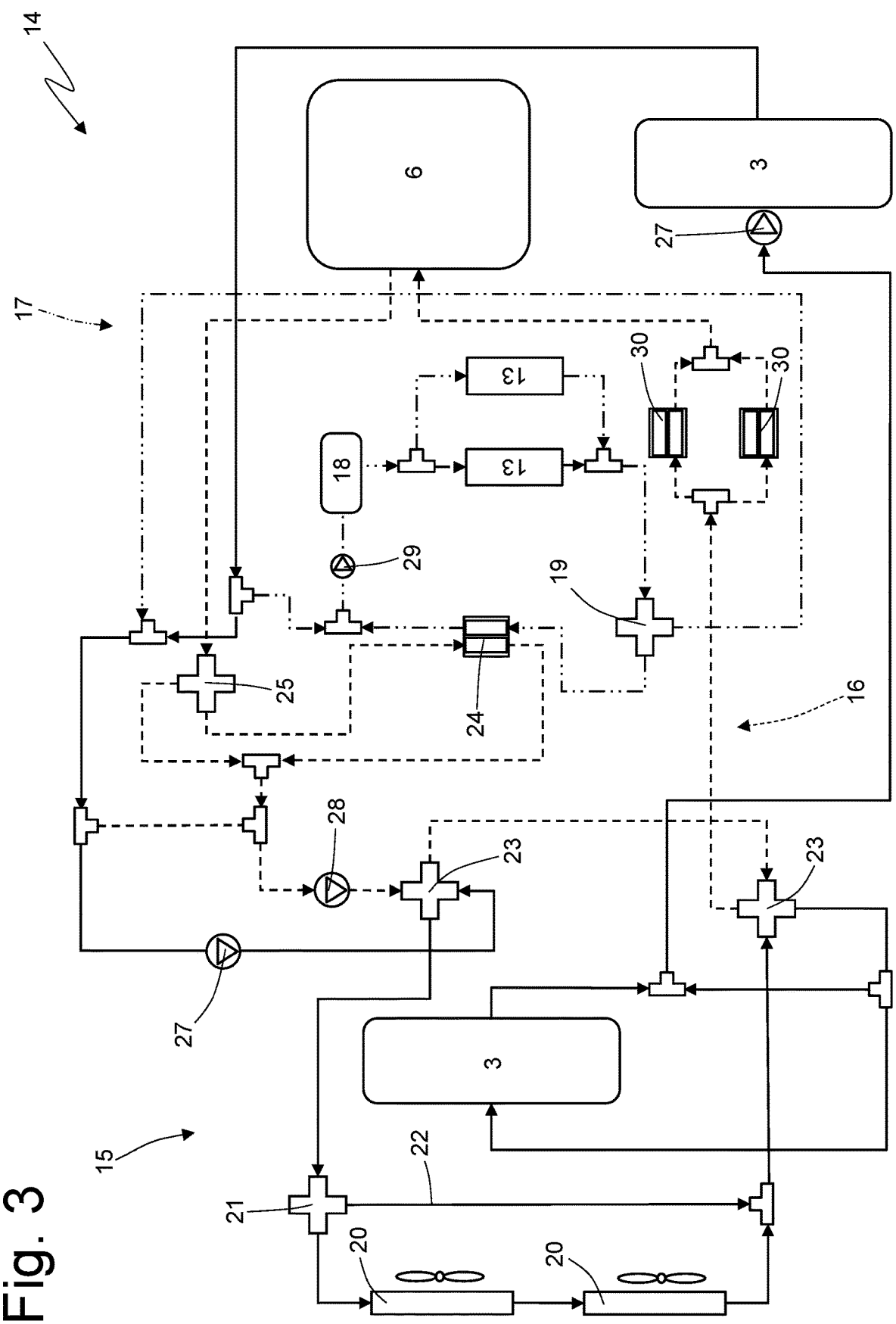
FIG. 3 is a schematic view of a thermoregulation system of the vehicle of FIG. 1.

According to FIG. 3, the vehicle 1 comprises a thermoregulation system 14 configured to adjust the work temperature of the drive systems 3, to adjust the work temperature of the battery 6 and to supply (when needed) heat (namely, hot fluid) to the heat exchangers 13 of the air conditioning system.

The thermoregulation system 14 comprises a thermoregulation circuit 15 configured to have the fluid (namely, the mixture of air and glycol) flow through the two drive systems 3; in particular, the thermoregulation circuit 15 has the same fluid flow both through the electric machines 4 and through the corresponding electronic power converters.

The thermoregulation system 14 comprises a thermoregulation circuit 16 configured to have the fluid (namely, the mixture of water and glycol) flow through the battery 6.

The thermoregulation system 14 comprises a thermoregulation circuit 17 configured to have the fluid (namely, the mixture of water and glycol) flow through the two heat exchangers 13 of the air conditioning system 11.

Along the thermoregulation circuit 17 there is an electric heater 18 (namely, a device using electrical energy to generate heat and, for example, comprising electric heating resistances), which can be operated so as to heat the fluid (namely, the mixture of water and glycol) flowing in the thermoregulation circuit 17.

The thermoregulation system 14 comprises a solenoid valve 19 (namely, an electrically-mechanically operated valved to be remotely controlled by means of electric pulses), which is movable between an isolation position, in which the fluid flowing through the thermoregulation circuit 15 does not flow through the thermoregulation circuit 17 (and vice versa), and a connection position, in which the fluid flowing through the thermoregulation circuit 15 also flows through the thermoregulation circuit 17 (and vice versa). Namely, when the solenoid valve 19 is in the isolation position, there is no exchange of fluid between the thermoregulation circuit 15 and the thermoregulation circuit 17, whereas, when the solenoid valve 19 is in the connection position, there is an exchange of fluid between the thermoregulation circuit 15 and the thermoregulation circuit 17.

Along the thermoregulation circuit 15 there are two radiators 20 arranged in series (one mounted on the right side of the vehicle 1 and the other mounted on the left side of the vehicle 1), through which the fluid (namely, the mixture of water and glycol) located in the thermoregulation circuit 15 can flow.

The thermoregulation system 14 comprises a solenoid valve 21, which can be adjusted so as to bypass the radiators 20; namely, by adjusting the solenoid valve 21, the fluid (namely, the mixture of water and glycol) located in the thermoregulation circuit 15 can flow through the radiators 20 or through a bypass duct 22, which is arranged in parallel to the radiators 20.

The thermoregulation system 14 comprises two solenoid valves 23, which are separate from one another and are movable between an isolation position, in which the fluid flowing through the thermoregulation circuit 15 does not flow through the thermoregulation circuit 16 (and vice versa), and a connection position, in which the fluid flowing through the thermoregulation circuit 15 also flows through the thermoregulation circuit 16 (and vice versa). Namely, when the solenoid valves 23 are in the isolation position, there is no exchange of fluid between the thermoregulation circuit 15 and the thermoregulation circuit 16, whereas, when the solenoid valves 23 are in the connection position, there is an exchange of fluid between the thermoregulation circuit 15 and the thermoregulation circuit 16.

The thermoregulation system 14 comprises a heat exchanger 24, which allows heat to be exchanged between the fluid present in the thermoregulation circuit 16 and the fluid present in the thermoregulation circuit 17; namely, the heat exchanger 24 comprises a side connected to the thermoregulation circuit 16 and another side connected to the thermoregulation circuit 17. In use, the heat exchanger 24 is used to transfer heat from the fluid flowing in the thermoregulation circuit 17 to the fluid flowing in the thermoregulation circuit 16, namely to heat the fluid flowing in the thermoregulation circuit 16 by using part of the heat owned by the fluid flowing in the thermoregulation circuit 17. The thermoregulation system 14 comprises a solenoid valve 25, which is movable between an isolation position, in which the fluid flowing through the thermoregulation circuit 16 does not exchange heat with the fluid flowing through the thermoregulation circuit 17 (namely, the fluids do not flow through the heat exchanger 24), and a connection position, in which the fluid flowing through the thermoregulation circuit 16 exchanges heat with the fluid flowing through the thermoregulation circuit 17 (namely, the fluids do not flow through the heat exchanger 24).

According to a different embodiment which is not shown herein, the heat exchanger 24 is absent and is replaced by a direct connection between the two thermoregulation circuits 16 and 17; in this embodiment, the solenoid valve 19 is movable between an isolation position, in which the fluid flowing through the thermoregulation circuit 16 does not flow through the thermoregulation circuit 17 (and vice versa), and a connection position, in which the fluid flowing through the thermoregulation circuit 16 also flows through the thermoregulation circuit 17 (and vice versa).

The vehicle 1 comprises a control unit 26 (schematically shown in FIGS. 1 and 2), which controls the operation of the thermoregulation system 14. Among other things, the control unit 26 is configured, when heat needs to be supplied to the heat exchangers 13 of the air conditioning system 11, to: estimate a total power consumption of the electric drive system 3 and of the electric heater 18 when the solenoid valve 19 is in the isolation position, estimate a total power consumption of the electric drive system 3 and of the electric heater 18 when the solenoid valve 19 is in the connection position, and move the solenoid valve 19 to the position having the smaller total power consumption of the electric drive system 3 and of the electric heater 18.

In other words, when heat has to be supplied to the heat exchangers 13 of the air conditioning system 11 (namely, when the air conditioning system 11 has to heat the passenger compartment 10), the heat requested by the heat exchangers 13 can be generated by the electric heater 18 and/or can be supplied by the two drive systems 3.

If the solenoid valve 19 is in the isolation position, the fluid flowing in the thermoregulation circuit 15 does not flow to the thermoregulation circuit 17 and, therefore, the heat generated by the two drive systems 3 cannot reach the thermoregulation circuit 17 and, hence, the heat exchangers 13; in this configuration, the fluid flowing in the thermoregulation circuit 15 can be caused to flow through the radiators 20 (by properly adjusting the solenoid valve 21) so as to disperse heat thereof in the external environment (namely, having it cool down in the radiators 20), thus reducing the inner temperature of the two drive systems 3, hence increasing the energy efficiency of the two drive systems 3 (since the electrical resistance of the conductors decreases as the temperature decreases and, hence, the power losses caused by Joule effect decrease in a proportional manner). Namely, if the solenoid valve 19 is in the isolation position, the temperature of the fluid flowing in the thermoregulation circuit 15 can be reduced by having the fluid flow through the two radiators 20 so as to (slightly) increase the energy efficiency of the two drive systems 3 and, hence, (given the same performances) reduce the electrical energy consumption of the electric drive systems 3. On the other hand, if the solenoid valve 19 is in the isolation position, all the heat requested by the heat exchangers 13 must be generated by the sole electric heater 18, which, hence, will have higher power consumptions.

If the solenoid valve 19 is in the connection position, the fluid flowing in the thermoregulation circuit 15 flows to the thermoregulation circuit 17 and, hence, the heat generated by the two drive systems 3 reaches the thermoregulation circuit 17 and, therefore, the heat exchangers 13; in this configuration, the fluid flowing in the thermoregulation circuit 15 is not normally caused to flow through the radiators 20 (by properly adjusting the solenoid valve 21) so as not to disperse the heat thereof in the external environment, since said heat has to be released to the heat exchangers 13 instead of being dispersed in the external environment. As a consequence, if the solenoid valve 19 is in the isolation position, all the heat (or at least part of the heat) requested by the heat exchangers 13 comes from the electric drive systems 3 and, therefore, the electric heater 18 has to generate less heat (or can remain completely turned off), thus featuring smaller power consumptions. On the other hand, if the solenoid valve 19 is in the connection position, the fluid flowing in the thermoregulation circuit 15 is hotter (because it has to release heat to the heat exchangers 13 and, hence, cannot be cooled in the radiators 20) and, therefore, the two drive systems 3 also operate at a higher temperature with a (slightly) smaller energy efficiency; namely, the two drive systems 3 (given the same performances) have a higher power consumption.

The control unit 26 is configured, when heat has to be supplied to the heat exchangers 13 of the air conditioning system 11, to establish whether, from the point of view of the total energy consumption of the electric drive system 3 and of the electric heater 18, the solenoid valve 19 should be arranged in the isolation position (in which the heat produced by the two drive systems 3 is dispersed in the external environment and does not help supply heat the heat exchangers 13) or whether the solenoid valve 19 should be arranged in the connection position (in which the heat produced by the two drive systems 3 is used to supply heat to the heat exchangers 13). The control unit 26 basically finds the most efficient compromise, from an energy point of view, between two opposing needs: keeping the temperature of the fluid flowing in the thermoregulation circuit 15 low in order to minimize the work temperature of the two drive systems 3 (thus increasing the energy efficiency of the two drive systems 3) and keeping the temperature of the fluid flowing in the thermoregulation circuit 15 high so as to transfer heat from the two drive systems 3 to the heat exchangers 13.

Owing to the above, it is evident that the control unit 26 is configured to control the solenoid valve 21 so as to bypass the radiators 20 when the solenoid valve 19 is in the connection position, so as not to cool, in the radiators 20, the fluid flowing in the thermoregulation circuit 15, so that the heat of said fluid can be used to heat the two heat exchangers 13 of the air conditioning system 11. To this regard, it should be pointed out that heat must be supplied to the two heat exchangers 13 of the air conditioning system 11 only when the outside temperature is low and, when the outside temperature is low, the radiators 20 do not necessarily have to be used to cool the fluid flowing in the thermoregulation circuit 15 (i.e. the fluid flowing through the two drive systems 3).

According to a preferred embodiment, each electric drive system 3 (namely, a controller of each electric drive system 3) is configured to cyclically provide the control unit 26 with its own power consumption in both positions of the solenoid valve 19; the power consumption of each electric drive system 3 in the current position of the solenoid valve 19 is an actual consumption, since it has actually been consumed, whereas the other power consumption of each electric drive system 3 in the other position (other than the current position) of the solenoid valve 19 is an estimated consumption, since the electric drive systems 3 are not currently working in this condition. Similarly, the electric heater 18 (namely, a controller of the electric heater 18) is configured to provide the control unit 26 with its own power consumption in both positions of the solenoid valve 19; the power consumption of the electric heater 18 in the current position of the solenoid valve 19 is an actual consumption, since it has actually been consumed, whereas the other power consumption of the electric heater 18 in the other position (other than the current position) of the solenoid valve 19 is an estimated consumption, since the electric heater 18 is not currently working in this condition.

From another point of view (which, as a matter of fact, is perfectly equivalent), each electric drive system 3 (namely, e controller of each electric drive system 3) is configured to provide the control unit 26 with its own current power consumption and with a variation in its own power consumption in case of a change in the position of the solenoid valve 19, Similarly, the electric heater 18 (namely, a controller of the electric heater 18) is configured to provide the control unit 26 with its own current power consumption and with a variation in its own power consumption in case of a change in the position of the solenoid valve 19.

In other words, each electric drive system 3 (namely, e controller of each electric drive system 3) is configured to provide the control unit 26 with its own current power consumption and how much its power consumption could be in the least favourable thermal conditions (which, if necessary, cab be obtained by changing the position of the solenoid valve 19). Similarly, the electric heater 18 (namely, a controller of the electric heater 18) is configured to provide the control unit 26 with its own current power consumption and how much its power consumption could be in the least favourable thermal conditions (which, if necessary, cab be obtained by changing the position of the solenoid valve 19).

The control unit 26 uses the power consumption information received from the electric drive systems 3 and from the electric heater 18 to determine in which position of the solenoid valve 19 it is possible to minimize the total power consumption of the electric drive system 3 and of the electric heater 18 (by minimizing the total power consumption it is obviously possible to maximize the range of the vehicle 1). In other words, by using this information, an optimization algorithm implemented in the control unit 26 establishes the minimum condition (i.e. the ideal condition) of the total power consumption of the electric drive system 3 and of the electric heater 18.

It should be pointed out that the search for the ideal condition (i.e. for the minimum condition of the total power consumption of the electric drive system 3 and of the electric heater 18) also takes into account the choices made by the driver of the vehicle 1, who has to choose whether to prefer a comfort driving mode (which does not jeopardize in any way the effectiveness of the air conditioning system 11) or an energy-saving driving mode (which jeopardizes the effectiveness of the air conditioning system 11, if it can be useful to reduce the total power consumption).

According to FIG. 3, the thermoregulation circuit 15 comprises two pumps 27, which are operated by respective electric motors in order to have the fluid flow along the thermoregulation circuit 15; preferably, one pump 27 is arranged in a front position close to the front drive system 3, whereas the other pump 27 is arranged in a rear position close to the rear drive system 3. The thermoregulation circuit 16 comprises one single pump 28, which is operated by a respective electric motor in order to have the fluid flow along the thermoregulation circuit 16. The thermoregulation circuit 17 comprises one single pump 29, which is operated by a respective electric motor in order to have the fluid flow along the thermoregulation circuit 17.

According to FIG. 3, the thermoregulation circuit 16 comprises two twin heat exchangers 30, which are connected to one another in parallel and allow heat to be exchanged between the fluid present in the thermoregulation circuit 17 and a refrigeration circuit, which is activated when the battery 6 has to be cooled; namely, each heat exchanger 30 comprises a side connected to the thermoregulation circuit 16 and another side connected to the refrigeration circuit. In use, each heat exchanger 30 is used to transfer heat from the fluid flowing in the thermoregulation circuit 16 to the fluid flowing in the refrigeration circuit, namely to cool the fluid flowing in the thermoregulation circuit 16 by releasing part of the heat to the fluid flowing in the refrigeration circuit.

According to a preferred embodiment, the control unit 26 is configured to move the solenoid valve 25 to the isolation position when the electric heater 18 is turned off and is configured to move the solenoid valve 25 to the connection position and to turn the electric heater 18 on so as to heat the battery 6 using at least part of the eat produced by the electric heater 18 (obviously, when the heat supplied by the two drive systems 3 is not enough the heat the battery 6).

Figure 4:
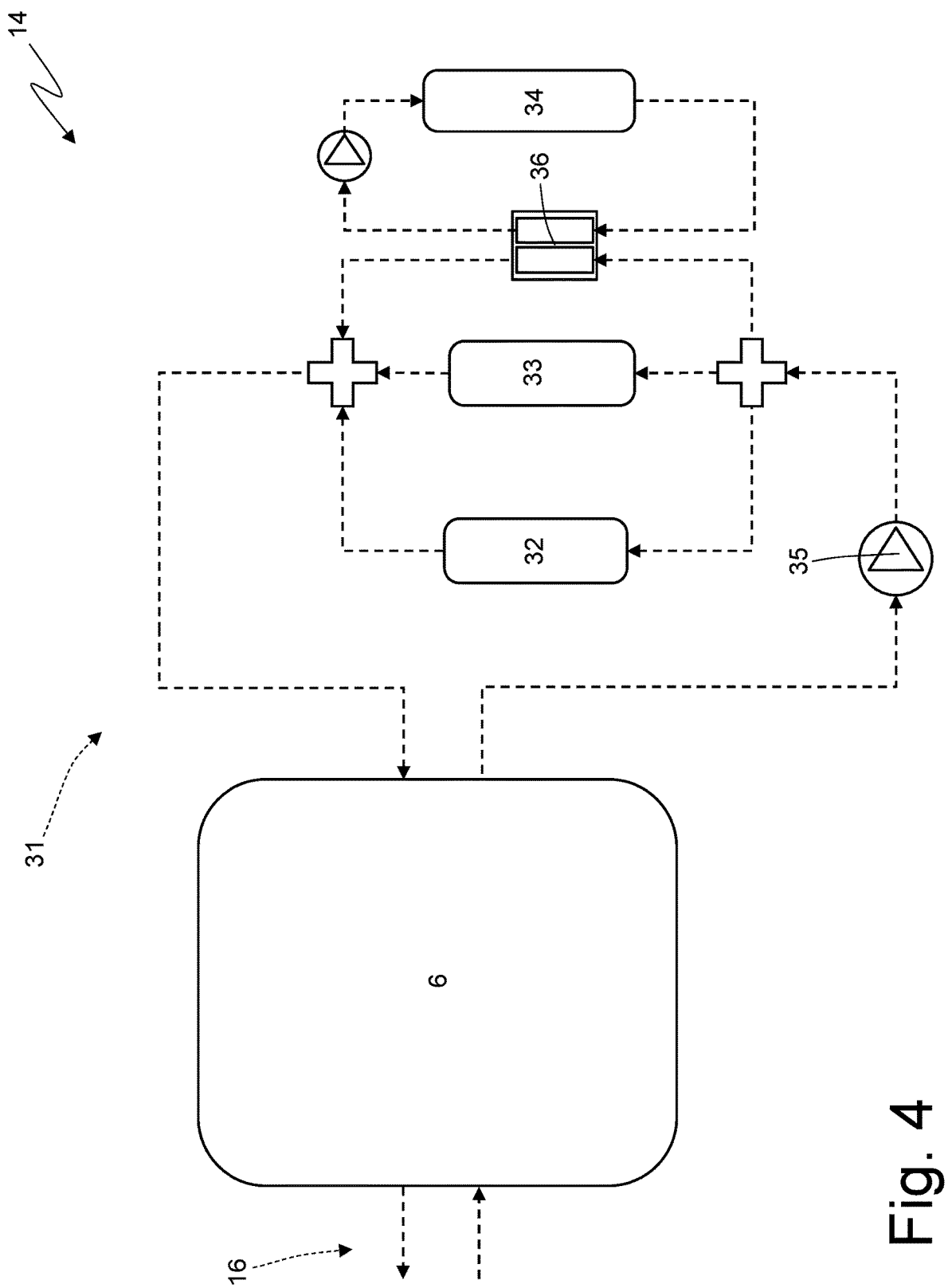
FIG. 4 is a schematic view of an appendage of the thermoregulation system of FIG. 3.

According to FIG. 4, the thermoregulation system 14 comprises a thermoregulation circuit 31, which represents an extension (appendage) of the thermoregulation circuit 16, is configured to have the fluid (namely, the mixture of water and glycol) flow through the components 32, 33 and 34 of the vehicle 1 located in a rear area of the vehicle 1 and is of the type disclosed in patent application PCT/IB2022/053258. According to a preferred embodiment, the component 32 consists of an on-board charger for the battery 6, the component 33 consists of a DC/DC converter powering low-voltage utilities of the vehicle 1 and the component 34 consist of a hydraulic circuit used by an electronically controlled active suspension system. The components 32, 33 and 34 are all arranged in a rear position behind the rear wall 9 of the battery 6 (namely, of the container 7) and, hence, are arranged in an opposite position relative to the rest of the thermoregulation system 14 (which is at the front). It should be pointed out that the components 32, 33 and 34 must be cooled when their inner temperature is high, but they never have to be heated since they do not have a minimum use temperature beyond which their performances are degraded (taking into account those climates where the vehicle 1 can reasonably be used).

The battery 6 has a connection to the thermoregulation circuit 16, which is arranged in a front position (namely, in the area of the front wall 8 of the container 7 of the battery 6) and a connection to the thermoregulation circuit 31, which is arranged in a rear position (namely, in the area of the rear wall 9 of the container 7 of the battery 6). Part of the fluid flowing through the thermoregulation circuit 16 flows through the thermoregulation circuit 31 (namely, the thermoregulation circuit 31 "drains" part of the fluid flowing through the thermoregulation circuit 16) and the connection between the two thermoregulation circuits 16 and 31 is made through the battery 6, which serves as hydraulic connection element. Namely, the thermoregulation circuit 31 comprises a retrieving point, which goes through the rear wall 9 of the battery 6 (namely, of the container 7) and retrieves the fluid from the battery 6, and comprises a restoring point, which goes through the rear wall 9 of the battery 6 (namely, of the container 7) and returns the thermoregulation liquid to the battery 6.

The thermoregulation circuit 31 comprises a circulation pump 35 and a heat exchanger 36 to cool a fluid of the hydraulic circuit of the suspensions (the modulation of the exchange in the heat exchanger 37 is carried out by adjusting the flow rates of the suspension circuit).

The embodiments described herein can be combined with one another, without for this reason going beyond the scope of protection of the invention.

The vehicle 1 described above has numerous advantages.

First of all, the thermoregulation system 14 of the vehicle 1 described above has, in all operating conditions, a high energy efficiency in the generation of the heat needed for the heating of the passenger compartment 10.

Furthermore, the thermoregulation system 14 of the vehicle 1 described above is compact and light, since it has a small number of components, for it uses the same components for several functions (for example, there is one single electric heater 18, which can be used both to heat the passenger compartment 10 (releasing heat to the air conditioning system 11 through the two heat exchangers 13) and to heat the battery 6 (releasing heat to the thermoregulation circuit 16 through the heat exchanger 24).

LIST OF THE REFERENCE NUMBERS OF THE FIGURES 1 vehicle
2 wheels
3 drive system
4 electric machine
5 drivetrain
6 battery
7 container
8 front wall
9 rear wall
10 passenger compartment
11 air conditioning system
12 air vents
13 heat exchanger
14 thermoregulation system
15 thermoregulation circuit
16 thermoregulation circuit
17 thermoregulation circuit
18 electric heater
19 solenoid valve
20 radiator
21 solenoid valve
22 bypass duct
23 solenoid valve
24 heat exchanger
25 solenoid valve
26 control unit
27 pump
28 pump
29 pump
30 heat exchanger
31 thermoregulation circuit
32 component
33 component
34 component
35 pump
36 heat exchanger
D travel direction

The invention claimed is:

1. A vehicle (1) comprising:
at least one electric drive system (3);
a battery (6);
a passenger compartment (10);
an air conditioning system (11) to air-condition the passenger compartment (10) and provided with at least one heat exchanger (13) configured to heat air using a hot fluid;
a first thermoregulation circuit (15) configured to have the fluid flow through the drive system (3);
a second thermoregulation circuit (16) configured to have the fluid flow through the battery (6);
a third thermoregulation circuit (17) configured to have the fluid flow through the heat exchanger (13) of the air conditioning system (11);
an electric heater (18), which is arranged along the third thermoregulation circuit (17) and can be operated in order to heat the fluid flowing in the third thermoregulation circuit (17);
at least one first solenoid valve (19) movable between an isolation position, in which the fluid flowing through the first thermoregulation circuit (15) does not flow through the third thermoregulation circuit (17), and a connection position, in which the fluid flowing through the first thermoregulation circuit (15) also flows through the third thermoregulation circuit (17); and
a control unit (26) configured, when heat needs to be supplied to the heat exchanger (13) of the air conditioning system (11), to:
estimate a total power consumption of the electric drive system (3) and of the electric heater (18) when the first solenoid valve (19) is in the isolation position;
estimate a total power consumption of the electric drive system (3) and of the electric heater (18) when the first solenoid valve (19) is in the connection position; and
move the first solenoid valve (19) to the position having the smaller total power consumption of the electric drive system (3) and of the electric heater (18).

2. The vehicle (1) according to claim 1, wherein:
the electric drive system (3) is configured to provide the control unit (26) with its own power consumption in both positions of the first solenoid valve (19); and
the electric heater (18) is configured to provide the control unit (26) with its own power consumption in both positions of the first solenoid valve (19).

3. The vehicle (1) according to claim 1, wherein:
the electric drive system (3) is configured to provide the control unit (26) with its own current power consumption and with a variation in its own power consumption in case of a change in the position of the first solenoid valve (19); and
the electric heater (18) is configured to provide the control unit (26) with its own current power consumption and with a variation in its own power consumption in case of a change in the position of the first solenoid valve (19).

4. The vehicle (1) according to claim 1 and comprising:
at least one radiator (20) arranged in the first thermoregulation circuit (15); and
a second solenoid valve (21), which can be adjusted so as to bypass the radiator (20).

5. The vehicle (1) according to claim 4, wherein the control unit (26) is configured to control the second solenoid valve (21) so as to bypass the radiator (20) when the first solenoid valve (19) is in the connection position.

6. The vehicle (1) according to claim 1 and comprising at least one third solenoid valve (23) movable between an isolation position, in which the fluid flowing through the first thermoregulation circuit (15) does not flow through the second thermoregulation circuit (16), and a connection position, in which the fluid flowing through the first thermoregulation circuit (15) also flows through the second thermoregulation circuit (16).

7. The vehicle (1) according to claim 6 and comprising two third solenoid valves (23), which are separate from one another and are movable between the isolation position, in which the fluid flowing through the first thermoregulation circuit (15) does not flow through the second thermoregulation circuit (16), and the connection position, in which the fluid flowing through the first thermoregulation circuit (15) also flows through the second thermoregulation circuit (16).

8. The vehicle (1) according to claim 1 and comprising at least one fourth solenoid valve (25) movable between an isolation position, in which the fluid flowing through the second thermoregulation circuit (16) does not exchange heat with the third thermoregulation circuit (17), and a connection position, in which the fluid flowing through the second thermoregulation circuit (16) exchanges heat with the third thermoregulation circuit (17).

9. The vehicle (1) according to claim 1 and comprising at least one fourth solenoid valve (25) movable between an isolation position, in which the fluid flowing through the second thermoregulation circuit (16) does not flow through the third thermoregulation circuit (17), and a connection position, in which the fluid flowing through the second thermoregulation circuit (16) also flows through the third thermoregulation circuit (17).

10. The vehicle (1) according to claim 8, wherein the control unit (26) is configured to move the fourth solenoid valve (25) to the isolation position when the electric heater (18) is turned off.

11. The vehicle (1) according to claim 8, wherein the control unit (26) is configured, when the heat provided by the drive system (3) is not enough to heat the battery (6), to move the fourth solenoid valve (25) to the connection position and to turn the electric heater (18) on so as to heat the battery (6) using at least part of the eat produced by the electric heater (18).

12. A method to control a vehicle (1) comprising:
at least one electric drive system (3);
a battery (6);
a passenger compartment (10);
an air conditioning system (11) to air-condition the passenger compartment (10) and provided with at least one heat exchanger (13) configured to heat air using a hot fluid;
a first thermoregulation circuit (15) configured to have the fluid flow through the drive system (3);
a second thermoregulation circuit (16) configured to have the fluid flow through the battery (6);
a third thermoregulation circuit (17) configured to have the fluid flow through the heat exchanger (13) of the air conditioning system (11);
an electric heater (18), which is arranged along the third thermoregulation circuit (17) and can be operated in order to heat the fluid flowing in the third thermoregulation circuit (17); and
at least one first solenoid valve (19) movable between an isolation position, in which the fluid flowing through the first thermoregulation circuit (15) does not flow through the third thermoregulation circuit (17), and a connection position, in which the fluid flowing through the first thermoregulation circuit (15) also flows through the third thermoregulation circuit (17);
the control method comprises, when heat needs to be supplied to the heat exchanger (13) of the air conditioning system (11), the steps of:
estimating a total power consumption of the electric drive system (3) and of the electric heater (18), if the first solenoid valve (19) is in the isolation position;
estimating a total power consumption of the electric drive system (3) and of the electric heater (18), if the first solenoid valve (19) is in the connection position; and
moving the first solenoid valve (19) to the position having the smaller total power consumption of the electric drive system (3) and of the electric heater (18).

* * * * *

UNITED STATES PATENT AND TRADEMARK OFFICE
CERTIFICATE OF CORRECTION

| | | |
|---|---|---|
| PATENT NO. | : 12,337,647 B2 | Page 1 of 1 |
| APPLICATION NO. | : 18/354314 | |
| DATED | : June 24, 2025 | |
| INVENTOR(S) | : Paolo Sacco et al. | |

It is certified that error appears in the above-identified patent and that said Letters Patent is hereby corrected as shown below:

On the Title Page

Insert item (30), Foreign Priority Document of --IT - 102022000015240 filed 2022-07-20--

Signed and Sealed this
Second Day of September, 2025

Coke Morgan Stewart
*Acting Director of the United States Patent and Trademark Office*